(12) United States Patent
Krishnan

(10) Patent No.: US 10,106,419 B2
(45) Date of Patent: Oct. 23, 2018

(54) METHOD OF MAKING GRAPHENE NANOCOMPOSITES BY MULTIPHASE FLUID DYNAMIC DISPERSION

(71) Applicant: Platinum Nanochem Sdn Bhd, Damansara Heights, Kuala Lumpur (MY)

(72) Inventor: Shutesh Krishnan, Kuala Lumpur (MY)

(73) Assignee: GRAPHENE NANOCHEM PLC (GB)

( * ) Notice: Subject to any disclaimer, the term of this patent is extended or adjusted under 35 U.S.C. 154(b) by 74 days.

(21) Appl. No.: 14/800,069

(22) Filed: Jul. 15, 2015

(65) Prior Publication Data

US 2016/0039679 A1 Feb. 11, 2016

(30) Foreign Application Priority Data

Aug. 11, 2014 (MY) .......................... PI 2014702229

(51) Int. Cl.
| | |
|---|---|
| *B01J 19/10* | (2006.01) |
| *C01B 31/04* | (2006.01) |
| *B01J 13/00* | (2006.01) |
| *B01J 19/00* | (2006.01) |
| *B01J 19/26* | (2006.01) |
| *B01J 3/08* | (2006.01) |

(52) U.S. Cl.
CPC ............. *C01B 31/0484* (2013.01); *B01J 3/08* (2013.01); *B01J 13/0008* (2013.01); *B01J 13/0026* (2013.01); *B01J 19/008* (2013.01); *B01J 19/10* (2013.01); *B01J 19/26* (2013.01); *B01J 2219/089* (2013.01)

(58) Field of Classification Search
CPC .......... B01J 19/10; B01J 20/20; C01B 32/186
See application file for complete search history.

(56) References Cited

U.S. PATENT DOCUMENTS

| | | | | |
|---|---|---|---|---|
| 7,816,006 B2* | 10/2010 | Yadav | ................. | A61L 27/06 428/402 |
| 8,691,179 B2* | 4/2014 | Kim | ................. | B82Y 30/00 423/448 |
| 2004/0180203 A1* | 9/2004 | Yadav | ................. | A61L 27/06 428/402 |

(Continued)

OTHER PUBLICATIONS

Cheng et al. KR 10-2013-0125887. Filed Oct. 22, 2013, Published Oct. 2, 2014.*

(Continued)

*Primary Examiner* — Michael A Salvitti
(74) *Attorney, Agent, or Firm* — TraskBritt

(57) ABSTRACT

A method of dispersing graphene and graphitic nanomaterials uses a multiphase fluid dynamic technique. The method includes a device, incorporating a high intensity fluid dynamics technique, controlling the expansion and compression ratio of the working stream that leads to an effective dispersion of the nanomaterial in the matrix. The condensation of the injected steam creates high intensity and controllable cavitation, leading to effective dispersion of the graphitic nanomaterial. The dispersion is most preferably done in a medium that creates a repulsive potential to balance the attractive inter-graphitic layer potential.

20 Claims, 2 Drawing Sheets

(56) References Cited

U.S. PATENT DOCUMENTS

| | | | | |
|---|---|---|---|---|
| 2012/0171108 A1* | 7/2012 | Kim | .................. | B82Y 30/00 423/448 |
| 2014/0056767 A1* | 2/2014 | Bedard | .................. | B01J 3/008 422/128 |
| 2014/0056768 A1* | 2/2014 | Bedard | .................. | B01J 3/008 422/128 |
| 2014/0056769 A1* | 2/2014 | Bedard | .................. | B01J 3/008 422/128 |
| 2014/0056770 A1* | 2/2014 | Bedard | .................. | B01J 3/008 422/128 |
| 2014/0056771 A1* | 2/2014 | Bedard | .................. | B01J 3/008 422/128 |
| 2014/0058158 A1* | 2/2014 | Bedard | .................. | B01J 19/10 585/537 |
| 2014/0058169 A1* | 2/2014 | Bedard | .................. | B01J 3/008 585/539 |
| 2014/0058170 A1* | 2/2014 | Bedard | .................. | B01J 3/008 585/539 |
| 2014/0058171 A1* | 2/2014 | Bedard | .................. | B01J 3/008 585/539 |
| 2014/0058172 A1* | 2/2014 | Bedard | .................. | B01J 3/008 585/539 |
| 2014/0058173 A1* | 2/2014 | Bedard | .................. | B01J 3/008 585/539 |
| 2014/0058174 A1* | 2/2014 | Bedard | .................. | B01J 3/008 585/539 |
| 2014/0058175 A1* | 2/2014 | Bedard | .................. | B01J 3/008 585/539 |
| 2014/0058176 A1* | 2/2014 | Bedard | .................. | B01J 3/008 585/539 |
| 2014/0058178 A1* | 2/2014 | Bedard | .................. | C07C 2/78 585/539 |
| 2014/0121346 A1* | 5/2014 | Tang | .................. | B01J 19/10 526/344 |
| 2015/0108411 A1* | 4/2015 | Chang, II | .................. | H01B 1/04 252/506 |
| 2015/0147235 A1* | 5/2015 | Ji | .................. | C01B 31/02 422/128 |
| 2015/0368535 A1* | 12/2015 | Dardona | .................. | C09K 5/14 428/368 |
| 2016/0039679 A1* | 2/2016 | Krishnan | .................. | B01J 19/008 516/32 |
| 2016/0276056 A1* | 9/2016 | Stolyarov | .................. | H01B 1/04 |

OTHER PUBLICATIONS

Eduardus Budi Nursanto et al., Facile synthesis of reduced graphene oxide in supercritical alcohols and its lithium storage capacity, Green Chemistry, 2011, 13, pp. 2714-2718.

* cited by examiner

METHOD OF MAKING GRAPHENE NANOCOMPOSITES BY MULTIPHASE FLUID DYNAMIC DISPERSION

CROSS-REFERENCE TO RELATING APPLICATION

This patent application claims the benefit of priority under 35 U.S.C. § 119 to Malaysian Patent Application No. PI 2014702229, filed in the Intellectual Property Corporation of Malaysia on Aug. 11, 2014, the disclosure of which is hereby incorporated herein in its entirety by this reference.

TECHNICAL FIELD

The present application relates to a method of dispersing graphene and graphene nanomaterials using a multiphase fluid dynamic technique. The method includes a device, incorporating a high intensity fluid dynamics technique, controlling the expansion and compression ratio of the working stream that leads to an effective dispersion of the nanomaterial in the matrix. The condensation of the injected steam creates a high intensity and controllable cavitation, leading to effective dispersion of the graphitic nanomaterial. The dispersion is most preferably done in a medium that creates a repulsive potential to balance the attractive inter-graphitic layer potential.

BACKGROUND

Exfoliated graphene or single layer graphene, by any known exfoliation methods, which is submerged in an aqueous solution or medium, has a tendency to bind with neighboring graphenes to form graphitic nanomaterials. In some manufacturing aspects, graphitic nanomaterials are less desirable than graphene because graphene possesses better mechanical, electrical, and physical properties to name a few.

Conventional techniques for dispersion of graphene includes a method of producing graphene dispersion by oxidizing graphite using a strong acid into graphite oxide which is readily exfoliated and dispersed in an aqueous solution. This is then reduced thermally or chemically to a graphene nanostructure. These methods are generally weakening the interlayer bonding force with the introduction of oxygen groups and increase in the lattice spacing that will lead to easy exfoliation by sonication. Introduction of polymer substances between the interlayer for the same purpose also have been reported in the literature or well known. However, in the case where the solvent system or exfoliation medium is changed, an additional complicated treatment process needs to be performed. These methods would cause severe damage to the graphene structure due to highly acidic nature of the solvent and requires high temperature processing followed by reduction. This method is also time-consuming. Therefore, a novel method of dispersing graphene nanomaterial into the host material needs to be developed; and such method should be compatible with a variety of aqueous solutions, polymers, or the like.

U.S. Pat. No. 8,691,179 B2 by Kim et al. discloses a method for fabricating graphene sheets or graphene particles under supercritical condition. The exfoliation is enhanced in the supercritical condition by an external source of sonication. Moreover, Kim et al. cite the publication "Facile synthesis of reduced graphene oxide in supercritical alcohols and its lithium storage capacity" by Nursanto et al. in Green Chemistry, 2011, 13, 2714-2718, which discloses that the dispersion method is carried out externally by using an ultrasonic means toward a reactor, and the reaction is then immersed into a molten potassium-sodium-calcium salt based bath.

One major disadvantage of using the external source to generate the sonic wave is that it cannot be efficiently used in a dynamic fluid condition. Especially in a high throughput industrial environment, the required energy density and residence time will not be sufficient. The external sonic wave source dependent cavitation technologies will also suffer from a number of other drawbacks. The diminishing effect of the sonic wave away from the source and the cavitation efficiency due to the vessel size are some to name. Hence, it is beneficial to alleviate the shortcomings with the multiphase fluid dynamic generated supersonic assisted dispersion of present application.

BRIEF SUMMARY

Accordingly, it is the primary aim of the present application to provide a *facile* and cost effective method of dispersing graphene and graphitic nanomaterials in a host material or carrier fluid where the suspension is stable for a long period of time using a multiphase fluid dynamic technique.

Another object of the present application is to provide a method and system to disperse graphene and graphitic nanomaterials by injected stream of supersonic speed dry air, dry steam or superheated steam, or wet steam or saturated steam.

Another object of the present application is to provide a method and system to disperse graphene and graphitic nanomaterials by breaking weak van der Waals forces between the graphitic nanomaterials in situ via controlled cavitation force of nanobubbles.

Yet another object of the present application is to provide a method of preparing dispersed graphene and graphitic nanomaterials in industrial scale.

These objects of the present application can be achieved by the aspects of the present application described below.

According to the preferred embodiment of the present application the following is provided:

A method of dispersing graphene and graphitic nanomaterials using multiphase fluid dynamic dispersion to produce graphene nanocomposites using shock waves (1) with extremely high specific energy, wherein the flowing multiphase working stream converts potential energy of the stream into high energy cavitation nanobubbles that when collapse generates supersonic shock interactions comprising:

injecting the entities comprising graphene, graphitic nanomaterial, carrier fluid, and a driving force into a supersonic dispersion reactor (2);

providing compression to the flowing mixture and increasing the speed of the mixture to supersonic range, wherein and subsequent condensation of the driving force in the mixture generates nanobubbles (4); and decelerating the mixture through supersonic threshold to collapse the nanobubbles and generate a high intensity cavitation leading to effective dispersion of the nanoparticles into the host material (6), characterized in that the entities and driving force merge into a highly compressible multiphase mixture.

BRIEF DESCRIPTION OF THE DRAWINGS

Other aspects of the present application and their advantages will be discussed in the Detailed Description in conjunction with the accompanying drawings in which.

DETAILED DESCRIPTION

In the following detailed description, numerous specific details are set forth in order to provide a thorough understanding of the invention. However, it will be understood by the person having ordinary skill in the art that the invention may be practiced without these specific details. In other instances, well known methods, procedures and/or components have not been described in detail so as not to obscure the invention.

The invention will be more clearly understood from the following description of the embodiments thereof, given by way of example only with reference to the accompanying drawings, which are not drawn to scale.

Figure 1:
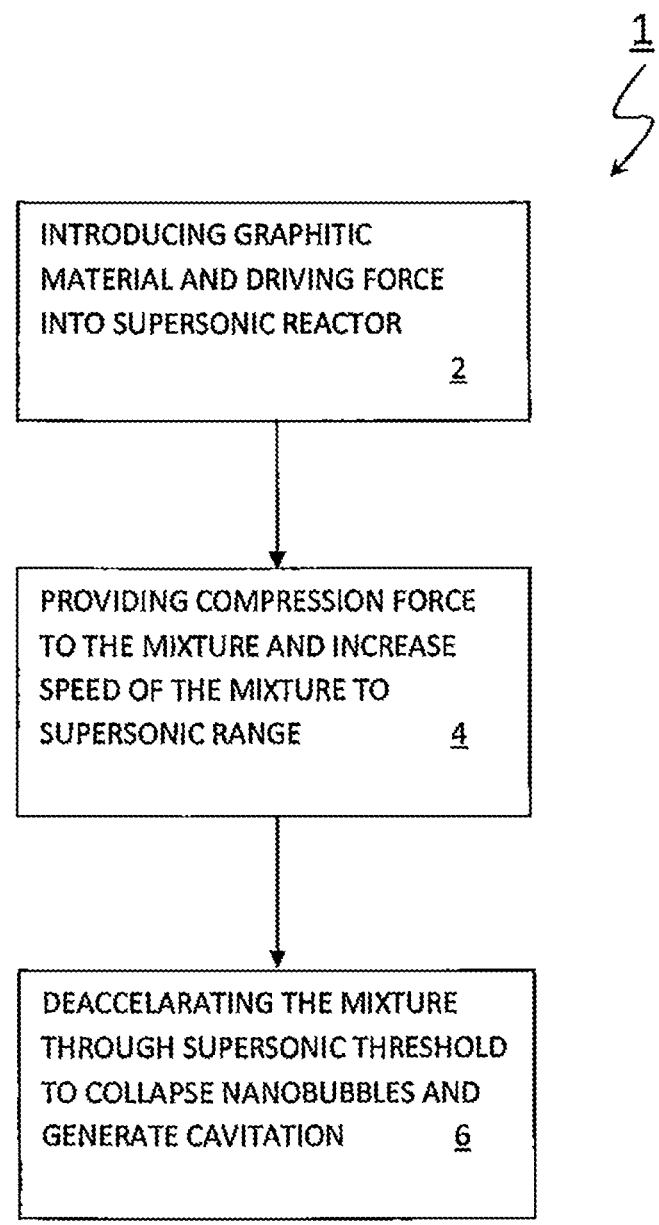
FIG. 1 shows a flow diagram of the present application of graphene nanocomposites dispersion from graphene and graphitic nanomaterials.

Referring to FIG. 1, the present application relates to a method to disperse graphene and graphitic nanomaterials to produce graphene nanocomposites (1) using supersonic shock waves with extremely high specific energy. Entities comprising graphene, graphitic nanomaterials, host material, carrier fluid, and a driving force are injected into the supersonic reactor chamber (2) to form a multiphase mixture. This is a non-chemical route for graphene nanocomposites dispersion. The supersonic speed changes dramatically for materials undergoing phase change, and can be orders of magnitude different. This introduces compressible effects (4) to the mixture and increases the speed of the mixture. The flow of the injected streams is controlled such that the mixture reaches the supersonic range. The flowing multiphase working stream converts potential energy of the stream into high energy cavitation nanobubbles. Due to deceleration of the mixture through supersonic threshold (6), the nanobubbles collapse generates supersonic shock interactions. This is achieved by controlling the internal geometry of the supersonic reactor, the injection nozzle size, and layout and the high compression ratio of homogeneous multiphase flow. The fluid dynamic changes within the reactor cause the working and injected streams to mix and accelerate. This creates a supersonic condition, and provides physical thrust to the discharge stream pressures. In one embodiment of the present application, the acceleration can be manipulated to create a transonic or hypersonic condition.

Figure 2:
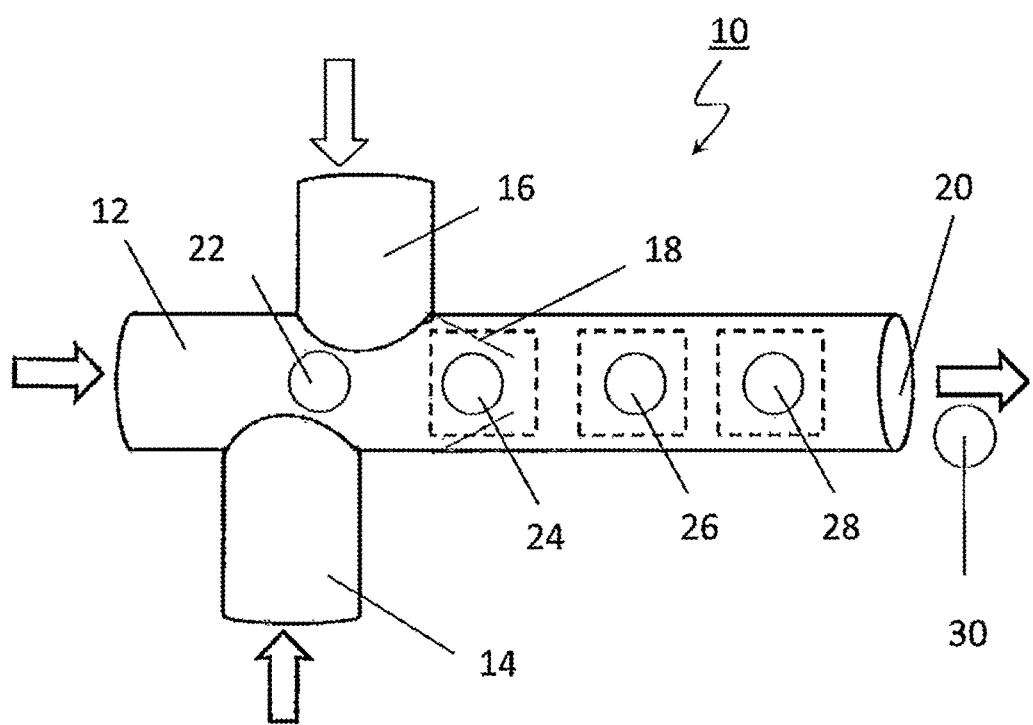
FIG. 2 shows an exemplary cross-sectional view of the present application of a multiphase supersonic reactor chamber with a plurality of reactor zones.

Referring to FIG. 2, in one embodiment of the present application, driving force or injection stream such as dry steam, dry air, wet steam, superheated steam or the like is injected into the supersonic chamber system (10) from at least one inlet (12).

The inlet (12) comprises at least one nozzle with different nozzle structures, capable of producing various fluid flow velocity at supersonic, transonic, or hypersonic depending on conditions required, such as production/yield rate, type of graphene to be produced in a medium, either water or aqueous solution, which contains the graphitic nanomaterial to be injected into the supersonic chamber system (10).

Subsequently, solid and dry graphitic nanomaterial (GNM) in powder form with particle size ranging from 10 nm to 10,000 nm, most preferably from 10 nm to 100 nm; the graphitic nanomaterial is graphene or graphene derivatives, functionalized graphitic material, intercalated graphitic material, carbon nanotubes (CNTs) or the like, is injected into the system (10) from at least one inlet (14).

The supersonic mixing zone (22) demarcated by a solid round circle, is created due to merging of the driving force of dry air, dry steam, wet steam, superheated steam or the like at supersonic speed with the GNM comprising water or aqueous solution. The zone (22) forms a highly compressible multiphase mixture with fluid flow velocity at a lower supersonic threshold of Mach 0.7-0.9.

Any person skilled in the art would appreciate that dry air can be drafted air from an air mover such as a centrifugal fan, or pneumatic air with a high compressed ratio compared to atmospheric air, the pneumatic air has preferably undergone prefiltration and drying. Wet steam is understood and defined as saturated steam at the temperature and pressure being supplied. Dry steam is defined and understood as superheated steam supplied beyond its saturation temperature and pressure. Hence, in this particular embodiment it is a multiphase fluid dynamic dispersion of two phases with the combination of gas-liquid, liquid-solid, or gas-solid.

The multiphase mixture then flows to the narrowing inlet valve zone (24) comprising narrowing inlet valve (18) that compresses and increases the flow speed of the multiphase mixture preferably to Mach 1.

The narrowing inlet valve zone (24) comprises of a plurality of narrowing inlet valves (18) arranged in series or in parallel to manipulate the speed of the mixture.

In nanobubbles generation zone (26) whereby the multiphase mixture travels at Mach 1, the driving force condenses in the mixture. This generates localized heat and nanobubbles in between the graphitic nanomaterials.

The speed decelerates through Mach 1 threshold at deceleration zone (28) and collapses the nanobubbles (generates high intensity cavitation). The cavitation disperses the graphene layers held by weak van der Waals forces.

The high intensity cavitation converts the localized thermal energy to kinetic thrust and discharges the working stream at a high pressure outlet zone (30) of an outlet (20) therethrough. In another embodiment of the present application, the discharge thrust can be controlled to enhance further the effectiveness of the dispersion in the nanocomposite matrix. This is achieved by controlling the internal geometry of the supersonic reactor, the injection nozzle size, the narrowing inlet valves dimension and layout, and the high compression ratio of homogeneous multiphase flow.

While the preferred embodiment of the present application and its advantages have been disclosed in the above Detailed Description, the invention is not limited thereto but only by the scope of the appended claims.

What is claimed is:

1. A method of dispersing graphitic material, comprising:
   combining a gaseous material, a graphitic nanomaterial, and a liquid material within a supersonic dispersion reactor to form a multiphase mixture;
   directing the multiphase mixture through one or more structures to form a compressed, supersonic multiphase mixture;
   condensing the gaseous material within the compressed, supersonic multiphase mixture to generate nanobubbles; and
   decelerating the compressed, supersonic multiphase mixture through the supersonic threshold to collapse the nanobubbles and generate supersonic shock interactions that disperse the graphitic nanomaterial in the liquid material.

2. The method of claim 1, wherein combining a gaseous material, a graphitic nanomaterial, and a liquid material within a supersonic dispersion reactor comprises delivering the gaseous material into the supersonic dispersion reactor at a supersonic speed, a transonic speed, or a hypersonic speed.

3. The method of claim 1, further comprising selecting the graphitic nanomaterial from the group consisting of graphene, a graphene derivative, functionalized graphitic material, intercalated graphitic material, and carbon nanotubes.

4. The method of claim 1, further comprising selecting the gaseous material from the group consisting of dry air, dry steam, wet steam, and superheated steam.

5. The method of claim 1, further comprising selecting the gaseous material from the group consisting of dry steam, wet steam, and superheated steam.

6. The method of claim 1, further comprising selecting the liquid material from the group consisting of water, an aqueous solution, an organic solvent, inorganic solvent, oil, and a polymer.

7. The method of claim 1, further comprising selecting the graphitic nanomaterial to comprise a powder having particle sizes within a range of from 10 nm to 10000 nm.

8. The method of claim 1, wherein the liquid material or the solid material is premixed with a metal or non-metal nanomaterial.

9. A method of dispersing a nanomaterial, comprising:

forming a compressible multiphase mixture comprising a liquid material, a graphitic nanomaterial, and a gaseous material;

adjusting a flow speed of the compressible multiphase mixture to greater than or equal to Mach 1;

condensing the gaseous material of the compressible multiphase mixture to generate nanobubbles between particles of the graphitic nanomaterial; and decelerating the flow speed of the compressible multiphase mixture through the supersonic threshold to collapse the nanobubbles and generate supersonic shock interactions to enhance dispersion of the graphitic nanomaterial in the liquid material.

10. The method of claim 9, further comprising selecting the graphitic nanomaterial to comprise a powder having particle sizes within a range of from 10 nm to 100 nm.

11. The method of claim 9, wherein forming a compressible multiphase mixture comprises:

delivering the gaseous material into a supersonic reactor chamber at a supersonic speed, a transonic speed, or a hypersonic speed;

delivering the liquid material and the graphitic material into the supersonic reactor chamber; and combining the gaseous material, the liquid material, and the graphitic material within the supersonic reactor chamber to form the compressible multiphase mixture.

12. The method of claim 9, wherein adjusting a flow speed of the compressible multiphase mixture to greater than or equal to Mach 1 comprises increasing the flow speed of the compressible multiphase mixture from a first speed within the range of from Mach 0.7 to 0.9 to a second speed greater than Mach 1.

13. The method of claim 12, wherein decelerating the flow speed of the multiphase mixture through the supersonic threshold comprises decreasing the flow speed of the compressible multiphase mixture to a third speed below Mach 1.

14. The method of claim 9, wherein adjusting a flow speed of the compressible multiphase mixture to greater than or equal to Mach 1 comprises directing the compressible multiphase mixture through narrowing inlet valves arranged in series to compress the compressible multiphase mixture and to increase the flow speed of the compressible multiphase mixture to greater than or equal to Mach 1.

15. The method of claim 9, wherein adjusting a flow speed of the compressible multiphase mixture to greater than or equal to Mach 1 comprises directing the compressible multiphase mixture through narrowing inlet valves arranged in parallel to compress the compressible multiphase mixture and to increase the speed of the compressible multiphase mixture to greater than or equal to Mach 1.

16. A method of dispersing a graphitic nanomaterial, comprising:

directing a gaseous material through a first inlet of a supersonic chamber system and into a mixing zone of the supersonic chamber system at a supersonic speed, a transonic speed, or a hypersonic speed;

directing a liquid material and nano-sized graphitic particles through a second inlet of the supersonic chamber system and into the mixing zone of the supersonic chamber system;

merging the gaseous material, the liquid material, and the nano-sized graphitic particles within the mixing zone of the supersonic chamber system to form a compressible multiphase mixture having a flow speed within a range of from Mach 0.7 to Mach 0.9;

directing the compressible multiphase mixture through a narrowing valve zone of the supersonic chamber system to compress the compressible multiphase mixture and increase the flow speed of the compressible multiphase mixture to Mach 1;

directing the compressible multiphase mixture through a nanobubble generation zone of the supersonic chamber system to generate localized heat within the compressible multiphase mixture and form nanobubbles of the gaseous material between the nano-sized graphitic particles of the compressible multiphase mixture; and directing the compressible multiphase mixture through a deceleration zone of the supersonic chamber system to reduce the flow speed of the compressible multiphase mixture to below Mach 1, collapse the nanobubbles of the gaseous material, and effectuate enhanced dispersion of the nano-sized graphitic particles in the liquid material.

17. The method of claim 16, wherein directing a gaseous material through a first inlet of a supersonic chamber system comprises direction of the gaseous material through at least one injection nozzle to increase a flow speed of the gaseous material to the supersonic speed, the transonic speed, or the hypersonic speed.

18. The method of claim 16, further comprising:

selecting the liquid material from the group consisting of water and an aqueous solution; and selecting the nano-sized graphitic particles to consist of particles having sizes within the range of from 10 nm to 100 nm.

19. The method of claim 16, wherein directing the compressible multiphase mixture through a narrowing valve zone of the supersonic chamber system comprises directing the compressible multiphase mixture through a plurality of narrowing valves arranged in series or in parallel.

20. The method of claim 1, further comprising selecting the graphitic nanomaterial to comprise graphene nanoparticles.

* * * * *